A. C. DAM.
DEMOUNTABLE RIM.
APPLICATION FILED JAN. 29, 1921.

1,408,173.

Patented Feb. 28, 1922.

Witness.
H. B. Davis.

Inventor.
Andrew C. Dam
by Noyes & Harrison
Atty.

UNITED STATES PATENT OFFICE.

ANDREW C. DAM, OF NEW YORK, N. Y.

DEMOUNTABLE RIM.

1,408,173. Specification of Letters Patent. Patented Feb. 28, 1922.

Application filed January 29, 1921. Serial No. 441,038.

*To all whom it may concern:*

Be it known that I, ANDREW C. DAM, a citizen of the United States, residing at New York, in the county of New York and State of New York, have invented certain new and useful Improvements in Demountable Rims, of which the following is a specification.

This invention relates to demountable holding-means for pneumatic tires, and has for its object the provision of an improved form of demountable rim, and an improved form of fixed rim arranged on the felly of the wheel, said rims being adapted for cooperative assembly and having locking-means associated with them, whereby the demountable rim is aligned or centered on the wheel and securely fastened in cooperative relation with the fixed rim, the demountable rim and its locking-means being adapted for removal at the outside of the wheel when the wheel is arranged on a vehicle.

Figures 1, 2:
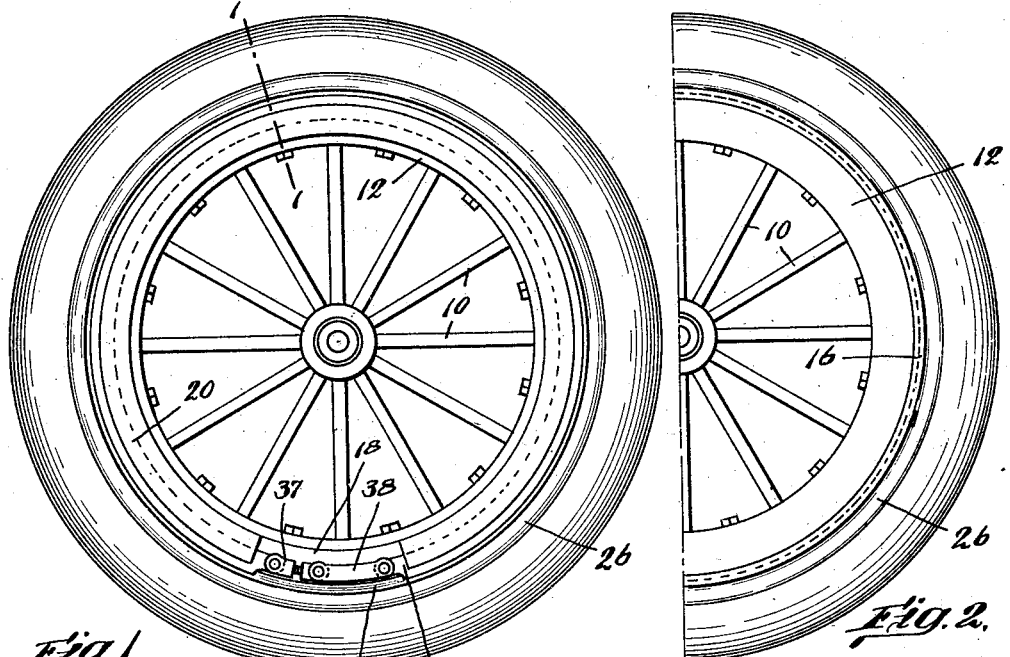
Fig. 1 is a side elevation of a wheel having demountable holding-means for a tire, embodying this invention.
Fig. 2 is a similar view showing the other side of the wheel.

The wheel comprising the spokes 10 and felly 12, is or may be of any usual or suitable construction, so far as my invention is concerned.

On the periphery of the felly 12, there is arranged a fixed rim 15, it being bolted or otherwise rigidly secured thereto. This fixed rim is or may be made of a width corresponding to the width of the felly, or thereabout. It has arranged on one of its edge-portions and extending, preferably, entirely around it, a stop flange 16, which is projected outward. It has its other edge-portion formed with an inclined portion 17, which is designed to extend to the side of the felly, and with an annular recessed portion formed of the walls 18, 19, and 20, which recessed portion extends inward toward the wheel axis, and over the side of the felly, at the outside of the wheel, assuming the wheel to be arranged on a vehicle.

Figures 3, 4:
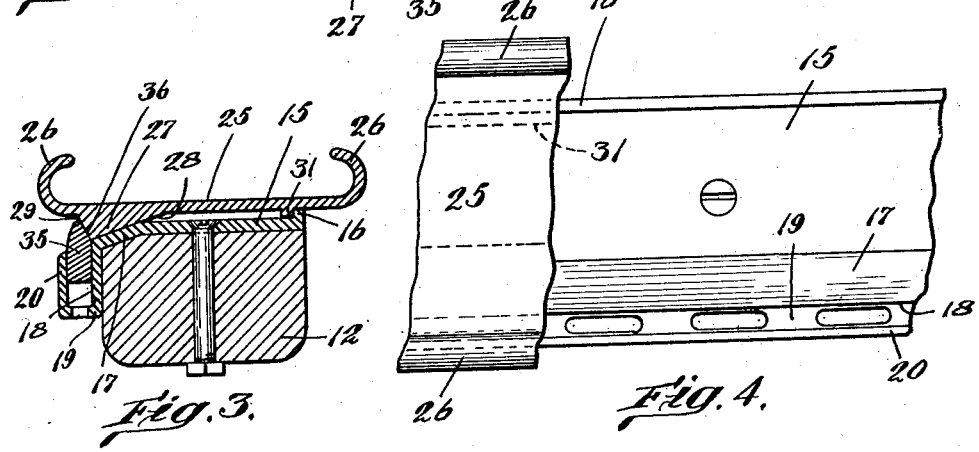
Fig. 3 is a transverse section of the felly and demountable holding-means, taken in the dotted line 1—1, Fig. 1.
Fig. 4 is a fragmentary detail, in plan view, of the rims.

The demountable rim 25 is adapted for lateral sliding engagement with the fixed rim, and to be locked in place thereon, and, as here shown, it is made wider than the fixed rim, and has its edge-portions extended outwardly, as at 26, 26, and curved or otherwise formed for engagement with a shoe or tire. Said rim 25 has on its under side near one edge, and extended entirely around it, an inwardly extended rib 27 having an inclined face 28 on its inside for engagement with the inclined face or portion 17 of the fixed rim to center or align the rim, and having an inclined face 29, on its outside for engagement with a locking-ring. The side-portion of the rib having the inclined face 29, extends over the recessed edge-portion of the fixed rim, and is, therefore, arranged at the outside of the wheel, when the wheel is arranged on a vehicle. Said rim 25 also has on its under side an inwardly-extended flange 31, or it may be a series of lugs extended entirely around it, adapted for engagement with the stop flange 16, on the fixed rim, thus to prevent lateral movement of the demountable rim with respect to the fixed rim, in a direction towards the right, Fig. 3, and to hold it against displacement in such manner as to prevent any wedging action of the inclined-face rib 27.

The locking-ring 35 is made as an adjustable ring, and is adapted to be arranged in the recessed edge-portion of the fixed rim. It has a bevel faced rib or portion 36, at its outer edge, adapted for engagement with the inclined face 29 of the rib 27 on the demountable rim, thus to draw the demountable rim into its final position and to hold it in place on the fixed rim by holding it against lateral relative movement with respect thereto, in a direction toward the left, Fig. 3. Said ring is made as an incomplete circle, and has arranged upon its end-portions a toggle-locking element, comprising two toggle members or links 37, 38, pivotally connected together, said members being pivotally connected at their outer extremities to the corresponding ends of the incomplete ring. One of the toggle members or links is preferably made adjustable longitudinally, as shown, whereby ample adjustment is provided. The toggle-elements are preferably curved on an arc corresponding to the arc of curvature of the rim. When the toggle element is straightened, as shown in full lines Fig. 1, it will be expanded and brought firmly into engagement with the inclined face 29 of the rib 27, and will thus hold the demountable rim 25 firmly in place. When the toggle is broken for disengagement from said rib for the removal of the demountable rim 25, the locking-ring will contract slightly, and draw further into the recess in the recessed portion of the fixed rim, and such contractile movement will be sufficient to enable the demountable rim to pass over it, and to be drawn off of the fixed rim, the recess of said recessed edge-portion being made deep enough to provide space for the contractile movement of the ring. Said recess, if desired, may have holes at the bottom at intervals throughout its length to enable dirt, and other foreign substances which might enter, to be removed.

Figure 5:
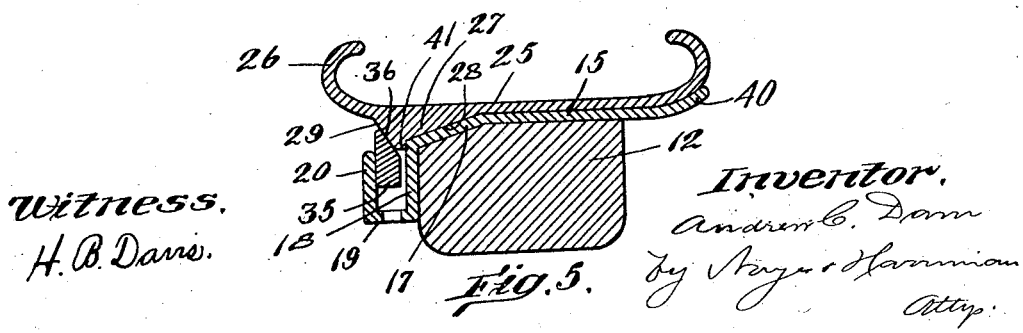
Fig. 5 is a transverse sectional view of a felly, and modified form of demountable holding-means arranged thereon.

In lieu of providing the stop-flange 16 on the fixed rim, and the flange 31, on the demountable rim, the inner edge of the fixed rim may be curved upward, as at 40, see Fig. 5, and a stop flange 41, may be formed on the rib 27, for engagement with the fixed rim, said fixed rim operating to hold the demountable rim 25 against lateral movement in an inward direction.

I claim:—

The combination with a wheel, of a fixed rim on the felly, a demountable rim adapted to be arranged on and secured to said fixed rim, and an expansible ring carried by said wheel and expansible into engagement with said demountable rim to force said rim on said fixed rim and lock it thereon, said rims having contacting supporting portions adjacent an edge thereof whereby that edge of the demountable rim is supported by said fixed rim and whereby said edge is guided on said fixed rim as said demountable rim is being arranged and secured on said fixed rim, said other edge of said demountable and fixed rims being provided with co-acting wedging surfaces which serve to tightly hold said demountable rim on said fixed rim and support that edge of said demountable rim by said fixed rim, said wedging surfaces and supporting portions receiving the entire weight supported by the wheel, said fixed rim having a grooved edge portion adjacent the wedge surface thereof, and said expansible ring arranged and held in said groove, said groove having substantially parallel side walls which closely fit and support said expansible ring, the top inner portion of said ring having a wedge surface, and said demountable rim having a co-acting wedge surface adjacent said first wedge and supporting surface adapted to be engaged by the wedge surface of said expansible ring to force said demountable rim on said fixed rim, the arrangement being such that the co-acting supporting surfaces and portions of said demountable and fixed rims support the entire weight supported by the wheel, with the two co-acting wedging surfaces forming means whereby the demountable rim is held secured on said fixed rim, and said expanded ring forming a circular flange carried by said fixed rim to positively lock said demountable rim on said fixed rim.

In testimony whereof, I affix my signature.

ANDREW C. DAM.